(12) United States Patent
Yamaguchi (10) Patent No.: US 7,448,840 B2
(45) Date of Patent: Nov. 11, 2008

(54) VEHICLE TRACTION DEVICE

(75) Inventor: Kikuo Yamaguchi, Kanagawa (JP)

(73) Assignee: Yamaguchi Wrecker Inc., Kanagawa (JP)

( * ) Notice: Subject to any disclaimer, the term of this patent is extended or adjusted under 35 U.S.C. 154(b) by 53 days.

(21) Appl. No.: 11/283,801

(22) Filed: Nov. 22, 2005

(65) Prior Publication Data

US 2006/0119073 A1    Jun. 8, 2006

(30) Foreign Application Priority Data

Nov. 24, 2004  (JP) ............................... 2004-339294

(51) Int. Cl.
*B60P 3/12* (2006.01)

(52) U.S. Cl. ...................................... 414/563

(58) Field of Classification Search ................ 414/563, 414/541, 542
See application file for complete search history.

(56) References Cited

U.S. PATENT DOCUMENTS

| 1,794,148 | A | * | 2/1931 | Collins ...................... 414/563 |
|---|---|---|---|---|
| 2,045,793 | A |   | 6/1936 | Pearson et al. |
| 2,183,478 | A | * | 12/1939 | Holmes et al. .............. 414/563 |
| 2,706,055 | A | * | 4/1955 | Nichols ....................... 414/563 |
| 3,595,408 | A | * | 7/1971 | Eddy et al. .................. 414/349 |
| 3,722,716 | A | * | 3/1973 | Tantlinger .................... 414/391 |
| 3,915,320 | A |   | 10/1975 | Curtis |
| 4,223,856 | A | * | 9/1980 | DiVincenzo ................. 244/50 |
| 4,611,968 | A | * | 9/1986 | Casteel ....................... 414/563 |
| 4,629,391 | A | * | 12/1986 | Soyk et al. .................. 414/563 |
| 4,658,933 | A | * | 4/1987 | Cheek et al. ................ 187/220 |
| 4,861,221 | A | * | 8/1989 | Krisa .......................... 414/563 |
| 4,948,327 | A | * | 8/1990 | Crupi, Jr. .................... 414/563 |
| 4,993,911 | A | * | 2/1991 | Grant .......................... 414/563 |
| 5,713,714 | A |   | 2/1998 | Walters |
| 6,926,300 | B2 |   | 8/2005 | Yamaguchi |

* cited by examiner

*Primary Examiner*—Charles A Fox
(74) *Attorney, Agent, or Firm*—Leydig, Voit & Mayer, Ltd.

(57) ABSTRACT

A vehicle traction device installed on a wrecker to raise wheels of a vehicle to be towed. The vehicle traction device has an arm which is inserted beneath the vehicle to be towed. The arm includes the retractable attachments which are vertically extended and retracted to lift the vehicle to be towed. Thus, it is possible to easily start towing the vehicle without troublesome setup work even if the vehicle to be towed has a low chassis, such as a four-axle vehicle.

5 Claims, 9 Drawing Sheets

VEHICLE TRACTION DEVICE

BACKGROUND OF THE INVENTION

1. Field of the Invention

The present invention relates to a vehicle traction device.

2. Background Art

Usually, when a vehicle, disabled due to a mechanical failure, traffic accident or the like, is towed by a wrecker, its front or rear wheels are kept up while the remaining wheels are left to roll.

Figure 9:
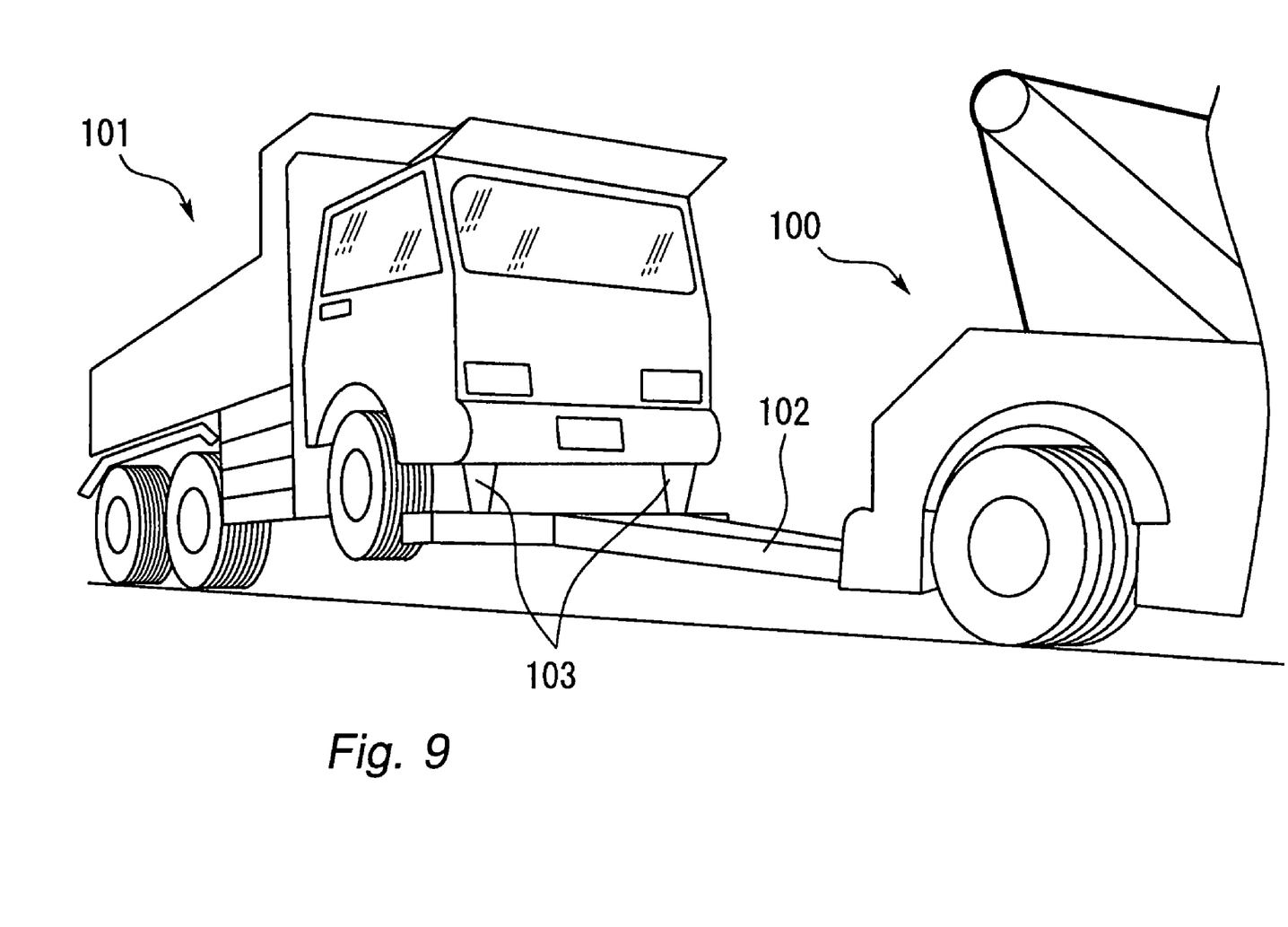
FIG. 9 schematically shows how the front wheels of a vehicle, disabled due to a mechanical failure, traffic accident or the like, is lifted up when towed.

FIG. 9 schematically shows how the front wheels of a vehicle 101, disabled due to a mechanical failure, traffic accident or the like, is lifted up when towed. As shown, a T-shaped arm 102 is extended from the wrecker 100 toward the towed vehicle 101. The front wheels are lifted up as a lower portion (front axle some other member in the vicinity thereof) of the towed vehicle 101 is held by vehicle traction attachments 103 fixed on the arm 102.

Loads carried by big-size trucks and other vehicles are recently becoming heavier. This has heightened the necessity to reduce the axle weights which act on tires. Therefore, there is a tendency for big-size vehicles to increase the number of tires per vehicle. In the field of big-size vehicles, four-axle type vehicles are consequently becoming more popular than conventionally dominant three-axle type vehicles such as the one shown in FIG. 9.

Figure 10A:
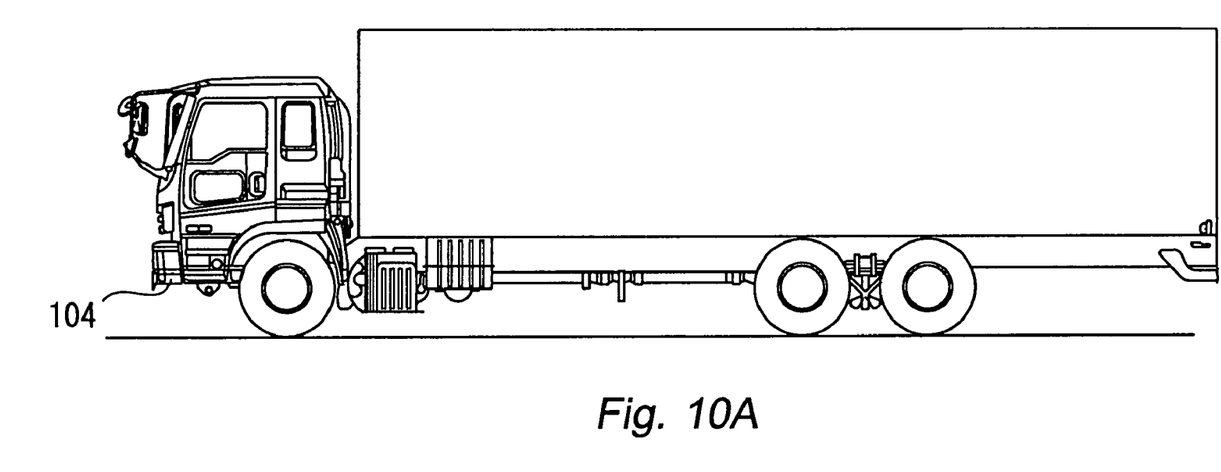
FIGS. 10A and 10B are schematic diagrams where a three-axle type big vehicle is compared with a four-axle type big vehicle.
Figure 10B:
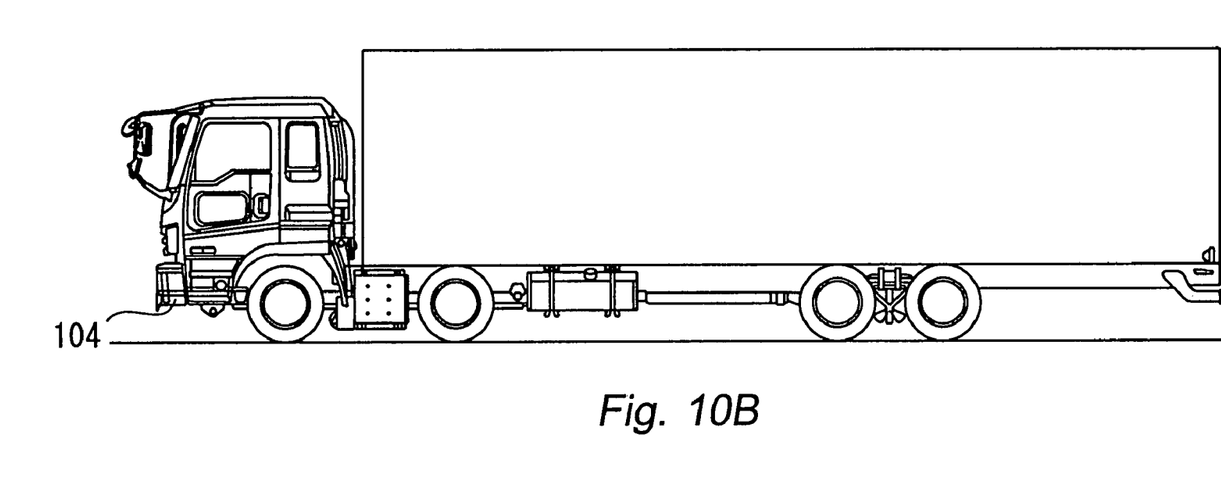

FIGS. 10A and 10B are schematic diagrams where a three-axle type big vehicle is compared with a four-axle type big vehicle. FIG. 10A is a side view of the three-axle type big vehicle while FIG. 10B is that of the four-axle type big vehicle. As shown in FIG. 10A, the three-axle type big vehicle has one axle on the front wheel side and two axles on the rear wheel side. In the case of the four-axle type big vehicle shown in FIG. 10B, it has two axles on both front and rear wheel sides. Since the four-axle type big vehicle is thus provided with two axles on the front wheel side, the individual axle weights can be reduced.

As the amount of load carried by a vehicle increases, its center of gravity goes higher. Therefore, the four-axle type big vehicle is provided with smaller-diameter tires than the three-axle type big vehicle. Since this lowers the center of gravity, it is possible to stably drive the vehicle even when the vehicle is fully loaded.

As described above, since the four-axle type big vehicle can lighten the axle weights and lower the center of gravity, it is possible to increase the amount of load carried as compared with the three-axle type big vehicle. It is therefore expected that the demand for four-axle type big vehicles will increase further.

However, since the four-axle type big vehicle employs smaller-diameter tires, its chassis is lower than that of the three-axle type big vehicle. Therefore, as shown in FIG. 10, the front bumper 104 of the four-axle type big vehicle is lower than that of the three-axle type big vehicle as well.

Therefore, the four-axle type big vehicle has a smaller space between the bumper 104 and the ground than that of the three-axle type big vehicle. This poses a problem that the bumper 104 may interfere with the attachments 103 when the attachments 103 are inserted below the chassis of the four-axle type big vehicle in order to tow the vehicle.

Figure 11:
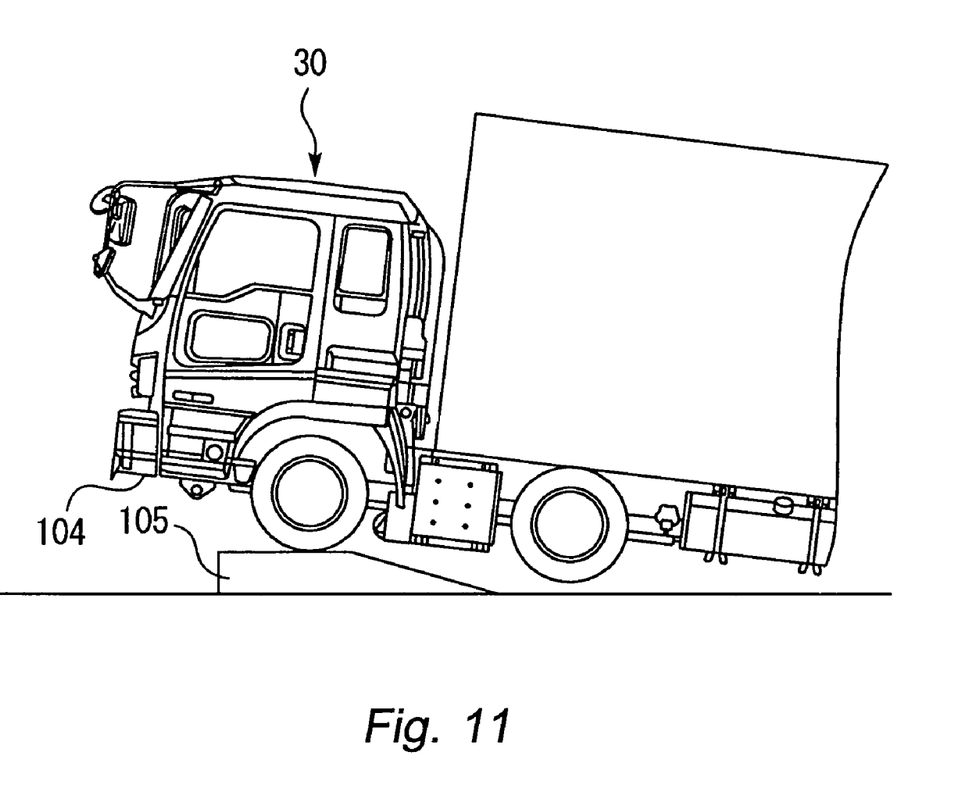
FIG. 11 shows the front wheels of the towed vehicle putted on a spacer to secure a sufficient space between the bumper and the ground before the attachments are inserted.

If interference occurs between the attachments 103 and the bumper 104, it is not possible to insert the attachments 103 below the chassis. In this case, troublesome operation is required. As shown in FIG. 11, the front wheels of the towed vehicle 101 must be put on a spacer 105 to secure a sufficient space between the bumper 104 and the ground before the attachments 103 are inserted.

In addition, even after the attachments 103 are inserted below the chassis, there remains a problem that since the top surface of the arm 102 is not so distant from the bottom surface of the bumper 104 of the four-axle type big vehicle, the arm 102 may come in contact with the bumper 104 due to vibrations, swings and the like during traction. Consequently, the arm 102 or the bumper 104 may be damaged.

SUMMARY OF THE INVENTION

The present invention was made to solve the aforementioned problem. It is an object of the present invention to provide a vehicle traction device capable of easily towing a vehicle even if the chassis of the towed vehicle is low.

According to a first aspect of the present invention, there is provided a vehicle traction device which is installed on a wrecker in order to raise wheels of a vehicle to be towed by the wrecker. The vehicle traction device comprises an insert section and retractable attachments. The insert section is inserted beneath the vehicle to be towed. The retractable attachments are provided with the insert section and extended and retracted vertically to lift the vehicle to be towed.

Since attachments provided with the insert section of a vehicle traction device according to the present invention are vertically retractable, the insert section can be inserted beneath a low-chassis vehicle by retracting the retractable attachments. Then, wheels of the vehicle to be towed can be lifted up by extending the retractable attachments upward after the insert section is inserted beneath the vehicle to be towed. Thus, it is possible to insert the insert section beneath the vehicle to be towed and easily start towing the vehicle without doing troublesome setup work even if the vehicle to be towed is a low chassis one such as a four-axle type big vehicle.

According to a second aspect of the present invention, there is provided the vehicle traction device, wherein the retractable attachments are driven pneumatically or hydraulically.

Since the retractable attachments are driven pneumatically or hydraulically, the vehicle to be towed can securely be lifted up even if the weight of the vehicle to be towed is large.

According to a third aspect of the present invention, there is provided the vehicle traction device, further comprising fixing means to fix the length of the retractable attachments to a certain length.

Therefore, the vehicle can be kept up for traction by setting the retractable attachments to a certain length.

According to a fourth aspect of the present invention, there is provided the vehicle traction device, wherein non-retractable attachments are further provided with the insert section. The vehicle to be towed are settled on the non-retractable attachments by shortening the length of the retractable attachments after the vehicle to be towed is lifted up by the retractable attachments.

Since non-retractable attachments are provided with the insert section, the vehicle to be towed can be settled on the non-retractable attachments by shortening the length of the retractable attachments after the vehicle to be towed is lifted up by the retractable attachments. Thus, the vehicle can be kept up for traction by the non-retractable attachments.

Other and further objects, features and advantages of the invention will appear more fully from the following description.

DETAILED DESCRIPTION OF THE PREFERRED EMBODIMENTS

Based on the drawings, the following will describe a few embodiments of the present invention. Note that each component common to drawings is given the same reference numeral in those drawings and its description is not repeated. Also note that the present invention is not limited to the embodiments described below.

First Embodiment

Figure 1:
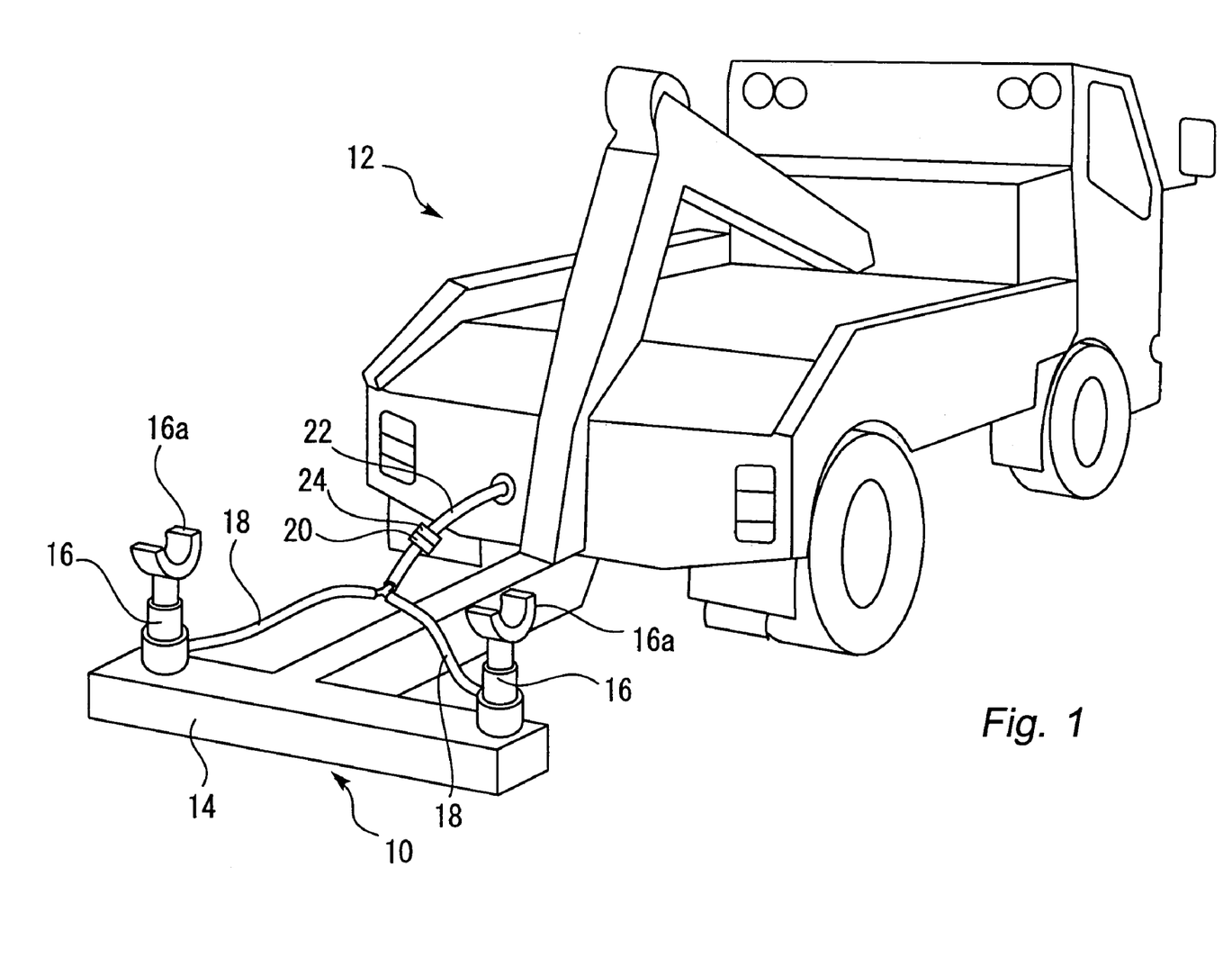
FIG. 1 is a schematic diagram showing a wrecker provided with a vehicle traction device in accordance with a first embodiment of the present invention.

FIG. 1 is a schematic diagram showing a wrecker 12 provided with a vehicle traction device 10 in accordance with a first embodiment of the present invention. As shown in FIG. 1, the vehicle traction device 10 is mounted at the rear end of the wrecker 12. By receiving power from the wrecker 12, the vehicle traction device 10 can perform required actions such as lifting and longitudinal (front-rear direction) retraction/extension.

As shown in FIG. 1, the vehicle traction device 10 has a T-shaped arm 14. The arm 14 can change its longitudinal position by using power from the wrecker 12. Also by using power from the wrecker 12, the arm 14 can perform lifting action by pivoting vertically upon its end on the wrecker 12 side.

Each wing of the T-shaped arm 14 is provided with a retractable attachment 16. Each retractable attachment 16 has a bearing portion 16a at the top end. The retractable attachments 16 are inserted below the chassis of a vehicle 30 to be towed. The vicinity of a hosing, leaf spring, coil spring, front axle or the like, which is integrated with the front or rear wheels of the vehicle 30, is held up by each bearing portion 16a.

Comprising a plurality of tubular members which function as pistons and cylinders, each retractable attachment 16 is configured so as to be extended and retracted vertically by air pressure. That is, the retractable attachment 16 is structurally similar to an air jack which uses an air cylinder to provide a stroke. Alternatively, the retractable attachments 16 may be of the hydraulically driven type. Further, the retractable attachments 16 may be configured so that they are driven by mechanically transferred power from the wrecker 12.

Figure 2A:
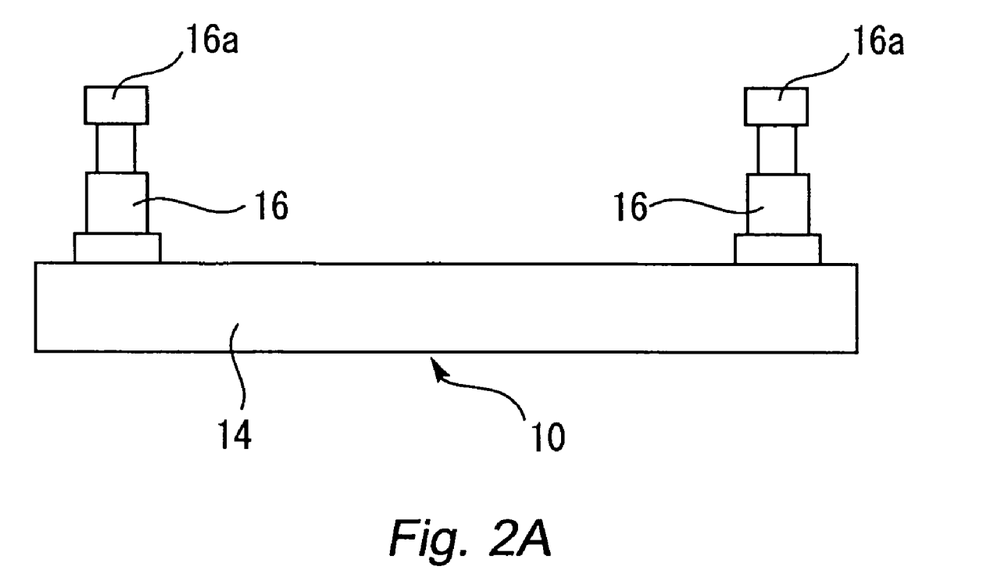
FIGS. 2A and 2B schematically show how the retractable attachments on the vehicle traction device 10 are extended and retracted.
Figure 2B:
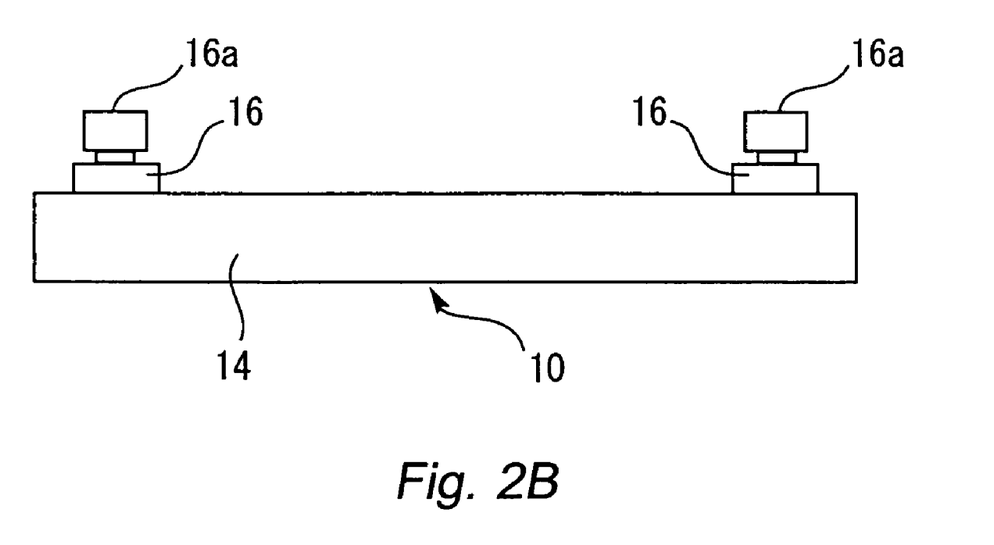

Viewed from behind the wrecker 12, FIGS. 2A and 2B schematically show how the retractable attachments 16 on the vehicle traction device 10 are extended and retracted. The length of the retractable attachments 16 is maximized in FIG. 2A while the length of the retractable attachments 16 is minimized in FIG. 2B.

As shown in FIG. 1, air hoses 18 are respectively attached to the retractable attachments 16 in order to feed compressed air. The two air hoses 18 are joined together into a single hose which has a connection valve 20 installed at the end thereof. In addition, a relay air hose 22 is extended from the wrecker 12 toward the retractable attachments 16. The relay air hose 22 is also provided with a connection valve 24 at the end thereof. This connection valve 24 is coupled with the connection valve 20 which is provided at the end of the air hose 18.

The wrecker 12 is provided with an air compressor to send compressed air to the retractable attachments 16 via the relay air hose 22 and the air hoses 18. By thus sending compressed air into the retractable attachments 16, it is possible to extend the retractable attachments 16 upward as shown in FIG. 2A. Compressed air in the retractable attachments 16 can be discharged from the wrecker 12 side. By this, it is possible to shorten the total length of the retractable attachments 16 as shown in FIG. 2B.

The connection valves 20 and 24 contain airflow shutoff valves. While the connection valves 20 and 24 are coupled together, air can flow through the connection valves 20 and 24 since their internal valves are kept open. If the connection valves 20 and 24 are decoupled from each other, air flows through the connection valves 20 and 24 are stopped since their internal valves are closed. That is, the connection valves 20 and 24 are structurally similar to an ordinary air chuck valve. Therefore, it is possible to fix the retractable attachments 16 to a desired length by feeding compressed air into the retractable attachments 16 from the wrecker 12 via the relay air hose 22 and the air hoses 18 until the retractable attachments 16 are set to the desired length and then decoupling the connection valves 20 and 24 from each other. This means that the connection valves 20 and 24 have a function as the means to fix the retractable attachments 16 to a specific length.

Note that this function can also be obtained with hydraulically driven retractable attachments 16. If the same supply system is configured with oil supply pipes which correspond to the aforementioned air hose 18 and relay air hoses 22 and oil flow shutoff valves are installed in the connection valves 20 and 24, it is possible to fix the retractable attachments 16 to a desired length.

Figure 3A:
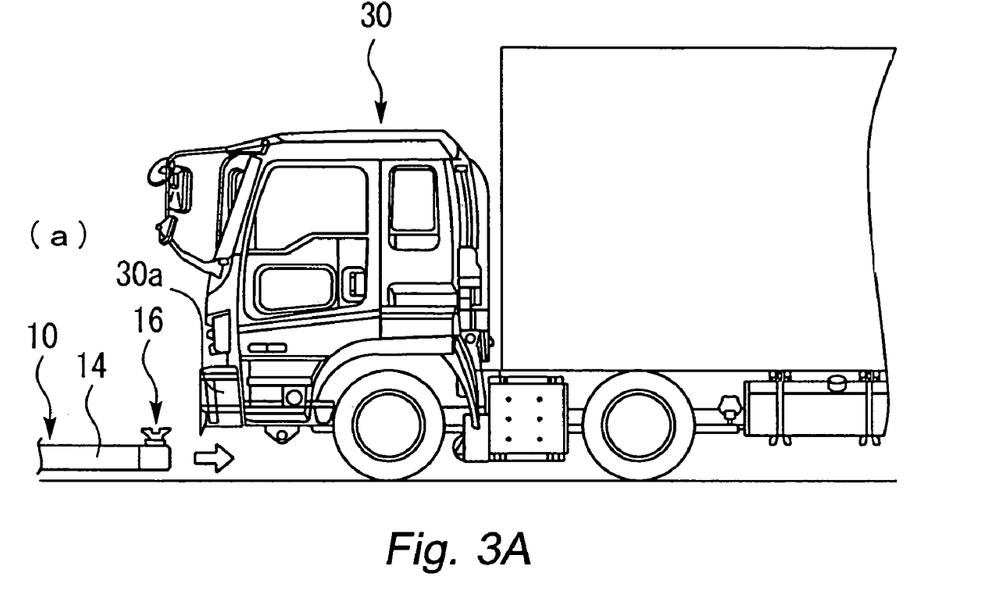
FIGS. 3A and 3B are schematic diagrams showing how the vehicle traction device is inserted below the vehicle in order to lift up the vehicle to be towed.
Figure 3B:
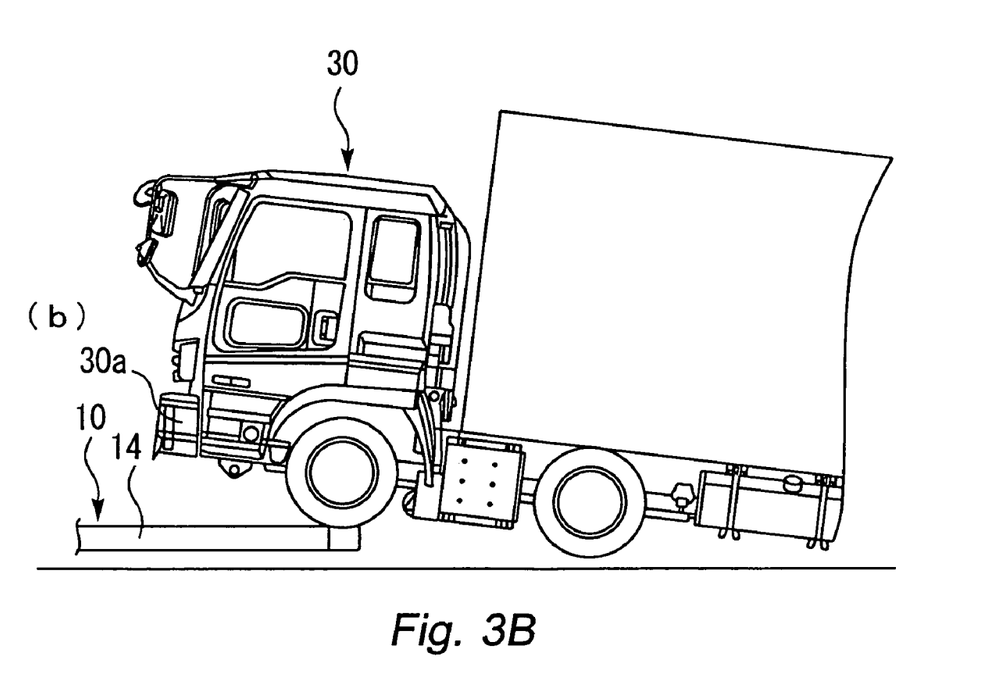

FIGS. 3A and 3B are schematic diagrams showing how the vehicle traction device 10 is inserted below the vehicle 30 in order to lift up the vehicle 30 to be towed. In FIG. 3A, the vehicle traction device 10 is being inserted below the vehicle 30 to be towed. As shown, the retractable attachments 16 are retracted to the minimum length when the vehicle traction device 10 is to be inserted below the vehicle 30 to be towed. This makes it possible to secure sufficient distance between the bumper 30a of the vehicle 30 to be towed and the top ends of the retractable attachments 16, preventing the bumper 30a from interfering with the retractable attachments 16 when the vehicle traction device 10 is inserted.

After set as shown in FIG. 3A, the vehicle traction device 10 is inserted below the vehicle 30 to be towed until it reaches a predetermined position. In this case, the vehicle traction device 10 is positioned so that the retractable attachments 16 come below the front axle of the vehicle 30 some other member in the vicinity thereof. Since the front axle or the nearby member is higher than the bottom of the bumper 30a and the retractable attachments 16 are set to the minimum length, there is a required space (for example, several or several ten centimeters) between the bearing portions 16a and the front axle or the nearby member.

FIG. 3B shows the result of extending the total length of the retractable attachments 16 by feeding compressed air into them after the vehicle traction device 10 is inserted to the predetermined position below the vehicle 30 to be towed. The front axle or the nearby member is held up by the bearing portions 16a of the retractable attachments 16 which are extended upward. Consequently, the front wheels of the vehicle 30 to be towed are kept up.

After the retractable attachments 16 are extended to a predetermined length, the connection valve 20 of the air hose 18 is detached from the connection valve 24 of the relay hose 22. This fixes the retractable attachments 16 to that length since compressed air is confined in the retractable attachments 16. Consequently, the vehicle 30 can be towed by driving the wrecker 12 forward since the front axle or the nearby member of the towed vehicle 30 is reliably held up by the bearing portions 16a of the retractable attachments 16.

Thus, the vehicle traction device 10 according to the present invention allows the retractable attachments 16 to be inserted easily below the vehicle 30 to be towed to lift up its wheels even if the chassis of the vehicle 30 is low. Therefore, it is possible to easily tow a four-axle type big vehicle which features a lower chassis.

According to the condition shown in FIG. 3B, since the retractable attachments 16 are extended sufficiently upward, it is possible to keep a sufficient distance between the bumper 30a of the vehicle 30 to be towed and the arm 14. Therefore, it is possible to reliably make the bumper 30a and the arm 14 free from damage during traction since swings, vibrations and the like do not cause contact between the bump 30a and the arm 14.

Figure 4:
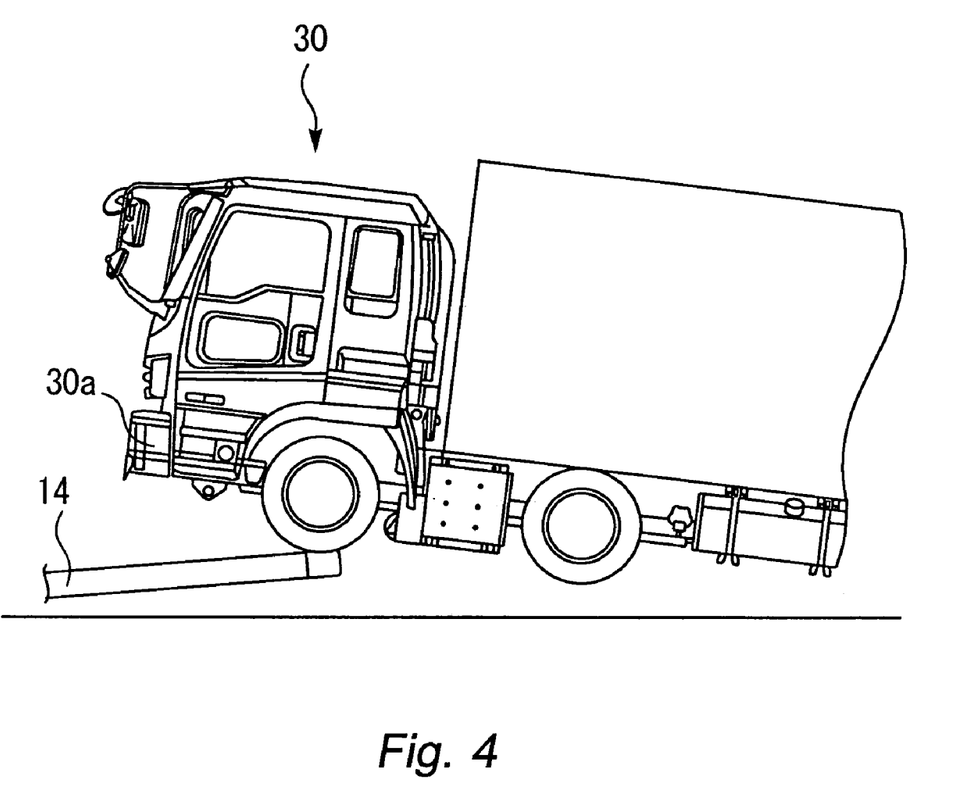
FIG. 4 shows the result of raising the arm after the retractable attachments 16 are extended.

FIG. 4 shows the result of raising the arm 14 after the retractable attachments 16 are extended. Raising the arm 14 further lifts up the vehicle 30 to be towed and therefore enlarges the distance between the bumper 30a and the arm 14 is increased. Therefore, this can surely prevent contact between the bumper 30a and the arm 14 as well as securing space between the arm 14 and the ground surface.

Raising the arm 14 in addition to extending the retractable attachments 16 can effectively make the bumper 30a sufficiently distant from the arm 14. The amount of lift by the retractable attachments 16 can be minimized by thus raising the arm 14. Therefore, since the vehicle 30 to be towed can quickly be lifted as desired, it is possible to start the traction in a shorter time.

Figure 5:
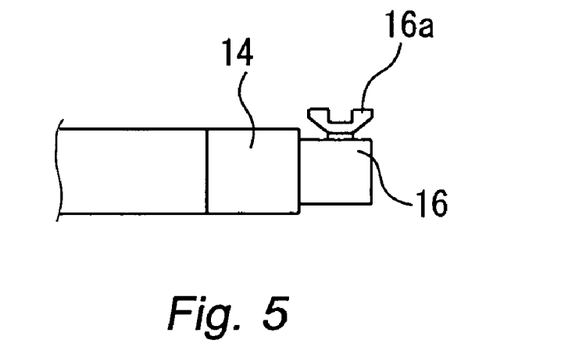
FIG. 5 is a schematic side view of the vehicle traction device.

FIG. 5 is a schematic side view of the vehicle traction device 10. In this example, the retractable attachments 16 are provided at the rear surface of the arm 14. If the retractable attachments 16 are provided at the rear surface of the arm 14 as shown in FIG. 5, it is possible to further lower the height of the bearing portions 16a, allowing the vehicle traction device 10 to be inserted securely below the vehicle 30 even if the chassis of the vehicle 30 to be towed is extremely low. As well, the retractable attachments 16 may be built into the arm 14.

According to the first embodiment, as described so far, since the attachments 16 provided on the wings of its T-shaped arm 14 of the vehicle traction device 10 can pneumatically be extended and retracted has, it is possible to insert the vehicle traction device 10 below the low chassis vehicle 30 by shortening the total length of the retractable attachments 16. Then, after the vehicle traction device 10 is inserted below the vehicle 30 to be towed, it is possible to lift up wheels of the vehicle by extending the retractable attachments 16 upward. Thus, it is possible to easily start towing the vehicle 30 without troublesome setup work even if the vehicle 30 to be towed is a low chassis one such as a four-axle type big vehicle.

Second Embodiment

Figure 6A:
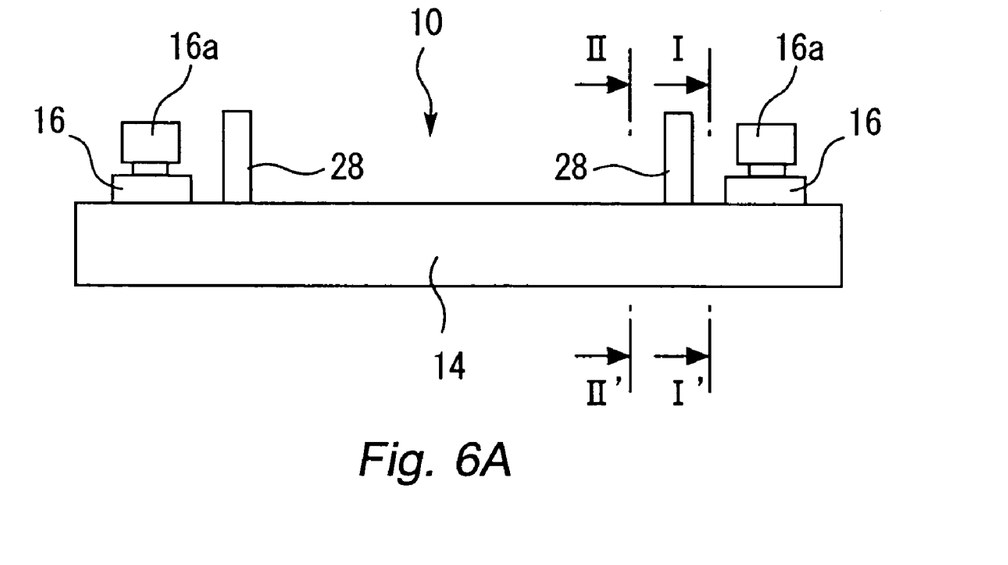
FIGS. 6A, 6B and 6C are schematic diagrams showing a vehicle traction device in accordance with the second embodiment.
Figure 6B:
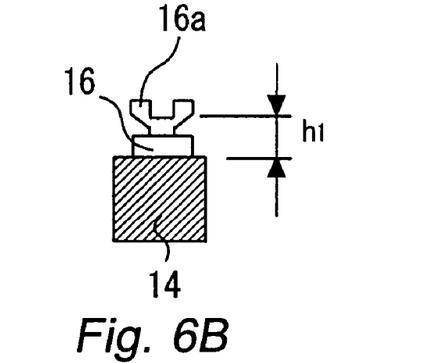
Figure 6C:
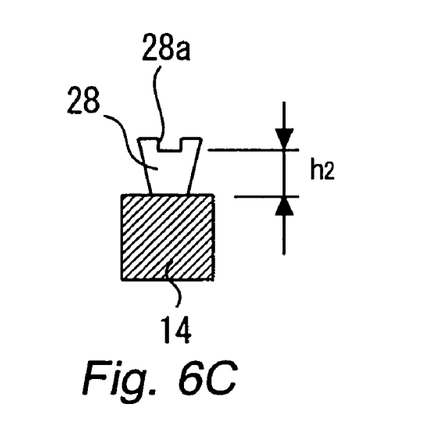

A second embodiment of the present invention is described below. FIGS. 6A, 6B and 6C are schematic diagrams showing a vehicle traction device 10 in accordance with the second embodiment. Similar to FIGS. 2A and 2B, the vehicle traction device 10 in FIG. 6A is viewed from behind the wrecker 12. FIG. 6B schematically shows its cross section taken along a dashed line I-I' in FIG. 6A. Likewise, FIG. 6C schematically shows its cross section taken along a dashed line II-II' in FIG. 6A.

The vehicle traction device 10 and wrecker 12 of the second embodiment are basically identical in configuration to those of the first embodiment. Similar to the first embodiment, the vehicle traction device 10 has a T-shaped arm 14 which is provided with retractable attachments 16 on the wings thereof. As shown in FIG. 6A, however, the second embodiment has non-retractable attachments 28 between the retractable attachments 16. Each of the non-retractable attachments 28 is a single-piece component shaped from a board, cast block or the like. The non-retractable attachments 28 have a fixed length.

As shown in FIG. 6C, the non-retractable attachments 28 have bearing portions 28a formed at their top ends. The heights of the non-retractable attachments 28 are made so low that even when the vehicle traction device 10 is inserted below a vehicle 30 having the lowest possible chassis, the top ends of the non-retractable attachments 28 do not touch the bumper 30a of the vehicle 30 to be towed. However, as shown in FIG. 6B and FIG. 6C, the height $h2$ of the non-retractable attachment 28, measured from the top surface of the arm 14 to the dented surface of the bearing portion 28a, is made not lower than the height $h1$ of the retractable attachments 16, measured from the top surface of the arm 14 to the dented surface of the bearing portion 16a. That is, the relation $h2\ h1$ is indicated in FIG. 6B and FIG. 6C.

Similar to the first embodiment, when the thus configured present vehicle traction device 10 embodiment is to be inserted beneath the vehicle 30 to be towed, the retractable attachments 16 is set to the shortest length.

Since the non-retractable attachments 28 are made sufficiently low as mentioned above, the vehicle traction device 10 can be inserted beneath the vehicle 30 similar as shown in FIG. 3A if the length of the retractable attachments 16 is minimized.

Similar to the first embodiment, the retractable attachments 16 are positioned below the front axle of the vehicle 30 or some other member in the vicinity thereof. Then, compressed air is fed into the retractable attachments 16 to thrust the front axle or the nearby member upward. Consequently, the front wheels of the vehicle 30 to be towed are raised in the same as shown in FIG. 3B.

Figure 7:
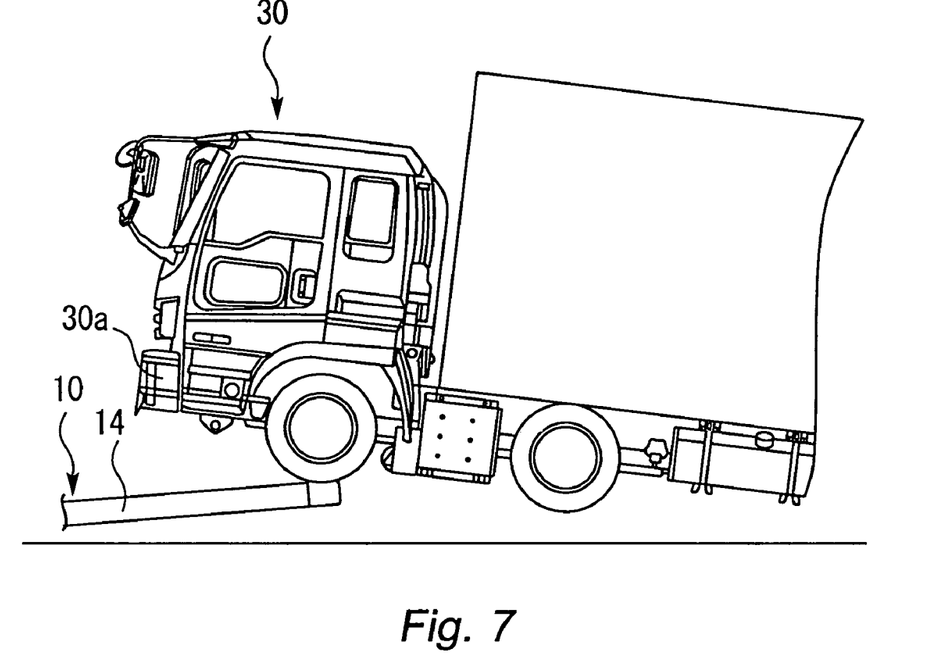
FIG. 7 shows the result of lifting up the arm.

In the case of the first embodiment, the length of the retractable attachments 16 is fixed at this time by detaching the connection valve 20 from the connection valve 24. In the case of the second embodiment, the arm is 14 is raised without stopping forcing compressed air into the retractable attachments 16. FIG. 7 shows the result of lifting up the arm 14. Since the lifting up of the arm 14 further raises the vehicle 30 to be towed, the bumper 30a is made further distant from the arm 14.

Figure 8:
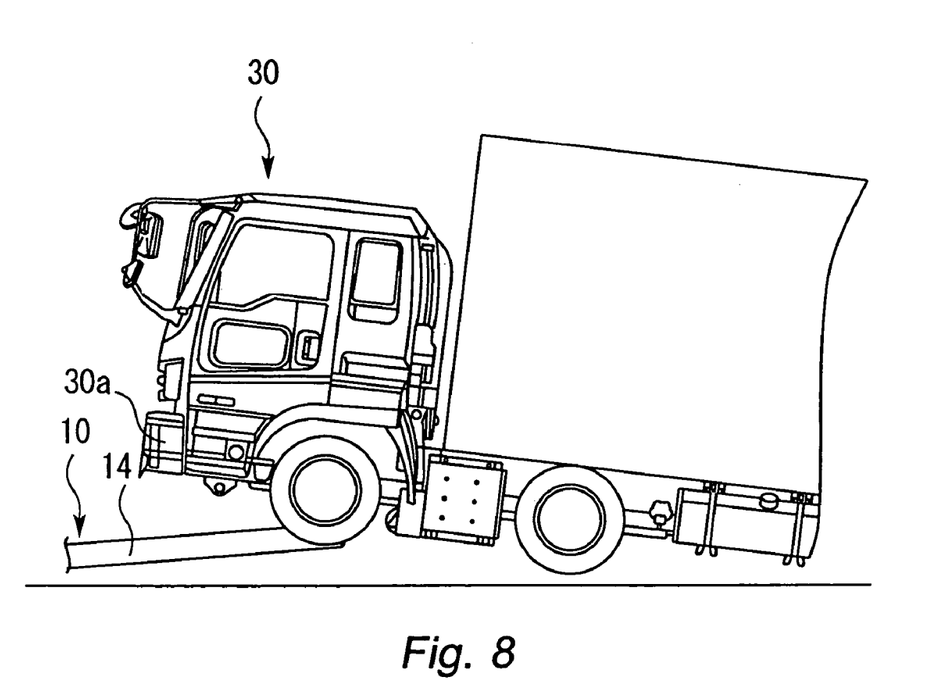
FIG. 8 shows the total length of the retractable attachments is minimized by releasing air from the retractable attachments.

After the arm 14 is lifted up and fixed, the total length of the retractable attachments 16 is minimized by releasing air from the retractable attachments 16. Consequently, the front wheels of the vehicle 30 to be towed is lowered as shown in FIG. 8. As aforementioned, when the retractable attachments 16 is fully retracted, its height h1 is lower than the height h2 of the non-retractable attachments 28. Therefore, the front axle of the vehicle 30 or the nearby member leaves the bearing portions 16a of the retractable attachments 16, is on the bearing portions 28a of the non-retractable attachments 28, and is held up by the bearing portions 28a.

Now, the vehicle 30 is ready to be towed by driving forward the wrecker 12 since the front axle of the vehicle 30 or the nearby member is securely held up by the bearing portions 28a of the non-retractable attachments 28.

If the arm 14 is provided only with the non-retractable attachments 28 thereon, the non-retractable attachments 28 can be inserted below the vehicle 30 and positioned just below its front axle or the nearby member but, since the height of the non-retractable attachments 28 is designed to be low as required, remain apart by some distance (for example, several or several ten centimeters) from the front axle of the nearby member as mentioned earlier. If the chassis of the vehicle 30 to be towed is low, the distance between the arm 14 and the bumper 30a is shorter than the distance between the bearing portions 28a and the front axle or the nearby member. Therefore, if the arm 14 is lifted up, the top surface of the arm 14 touches the bumper 30a before the front axle or the nearby member gets held up by the bearing portions 28a. Thus, if only the non-retractable attachments 28 are provided, the vehicle 30 to be towed can not be lifted up by the non-retractable attachments 28.

According to the configuration of the second embodiment, since the retractable attachments 16 are used in the process of putting the front axle of the vehicle 30 or the nearby member on the non-retractable attachments 28, it is possible to get the front axle or the nearby member held up by the non-retractable attachments 28 even if the heights of the non-retractable attachments 28 are sufficiently made so low. In addition, more reliable traction is possible since the vehicle 30 is held up by the non-retractable attachments 28 during traction which is superior in robustness due to its non-retractable structure.

Note that the second embodiment may also be configured in such a manner that the retractable attachments 16 and the non-retractable attachments 28 are provided at the rear surface of the arm 14 as shown in FIG. 5. Also in this case, if the dented surfaces of the bearing portions 28a are made higher than those of the bearing portions 16a of the retractable attachments 16, the front axle or the nearby member can securely get held up by the bearing portions 28a of the non-retractable attachments 28 when the retractable attachments 16 are fully retracted.

According to the second embodiment, as described so far, the vehicle 30 to be towed can get held up by the non-retractable attachments 28 by inserting the vehicle traction device 10 beneath the vehicle 30, extending the retractable attachments 16, lifting up the arm 14 and fully retracting the retractable attachments 16. Thus, traction can be performed by using the non-retractable attachments 28 which can support the load more reliably.

Obviously many modifications and variations of the present invention are possible in the light of the above teachings. It is therefore to be understood that within the scope of the appended claims the invention may by practiced otherwise than as specifically described.

The entire disclosure of a Japanese Patent Application No. 2004-339294, filed on Nov. 24, 2004 including specification, claims, drawings and summary, on which the Convention priority of the present application is based, are incorporated herein by reference in its entirety.

The invention claimed is:

1. A vehicle towing device for a wrecker comprising:
   an arm having a T-shape including a tongue and two wings extending transverse to the tongue; and
   a pair of pneumatically or hydraulically driven cylinders, each cylinder being located on a respective wing and being extendable and retractable vertically and substantially perpendicular to the wings, between a maximum extended length and a minimum retracted length, in response to application of and withdrawal of pneumatic or hydraulic pressure, respectively, each cylinder including, at an upper distal end, a first bearing portion for engaging a member of a vehicle to be towed, wherein,
      with the cylinders retracted to the minimum retracted length, the wings can be inserted under the vehicle to be towed so that the bearing portions are spaced from and can pass under the bumper of the vehicle to be towed, and
      when the cylinders are extended by the application of pneumatic or hydraulic pressure so the bearing portions engage the member of the vehicle to be towed, the bearing portions are higher than part of the bumper of the vehicle to be towed.

2. The vehicle towing device according to claim 1, further including a pair of non-retractable supports, each non-retractable support being mounted on a respective wing, proximate a respective cylinder, projecting vertically and substantially perpendicular to the respective wing, each non-retractable support including, at an upper distal end, a second bearing portion for engaging a member of the vehicle to be towed, wherein the non-retractable supports extend, vertically and perpendicular to the wings, a fixed vertical distance from the wings with respect to the respective cylinders and that is longer than the minimum retracted length of the cylinders.

3. The vehicle towing device according to claim 1, wherein each of the cylinders includes a hose for transmitting pneumatic or hydraulic pressure to the cylinder, and hoses from the cylinders are joined to a check valve for maintaining, after disconnection of a source of pressure from the hoses, a pressure established in the cylinders before disconnection of the source of pressure from the hoses.

4. The vehicle towing device according to claim 1, wherein the tongue is pivotally connected to the wrecker at a location remote from the wings for raising a vehicle engaged by the first bearing portions.

5. A vehicle towing device for a wrecker comprising:
   an arm having a T-shape including a tongue and two wings extending transverse to the tongue;
   a pair of pneumatically or hydraulically driven cylinders, each cylinder being located on a respective wing and being extendable and retractable vertically and substantially perpendicular to the wings in response to application of and withdrawal of pneumatic or hydraulic pressure, respectively, each cylinder including, at an upper distal end, a first bearing portion for engaging a member of a vehicle to be towed, wherein the cylinders have a minimum vertical extension relative to the wings when no pneumatic or hydraulic pressure is applied to the cylinders; and a pair of non-retractable supports, each non-retractable support being mounted on a respective wing proximate a respective cylinder, projecting vertically and substantially perpendicular to the respective wing, each non-retractable support including, at an upper distal end, a second bearing portion for engaging the member of the vehicle to be towed, wherein the non-retractable supports extend, vertically and perpendicular to the wings, a distance longer than the minimum vertical extension of the cylinders, and each of the first and second bearing portions includes a concavity for retaining the member of the vehicle to be towed.

* * * * *